F. ZUGG.
Vapor-Stove.

No. 221,205. Patented Nov. 4, 1879.

Witnesses:
Jno. Web. Collins
L. Colburn.

Inventor:
Florian Zugg
by G. B. Towles.
Attorney.

UNITED STATES PATENT OFFICE.

FLORIAN ZUGG, OF PEORIA, ILLINOIS.

IMPROVEMENT IN VAPOR-STOVES.

Specification forming part of Letters Patent No. 221,205, dated November 4, 1879; application filed October 8, 1879.

*To all whom it may concern:*

Be it known that I, FLORIAN ZUGG, of the city of Peoria, in the county of Peoria, in the State of Illinois, have invented a new and useful Improvement in Gas-Stoves; and I do hereby declare that the following is a full, clear, and exact description thereof, reference being had to the annexed drawings, making a part of this specification, in which—

Figure 1:
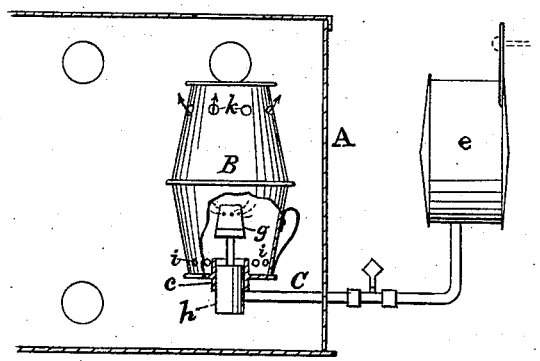
Figure 2:
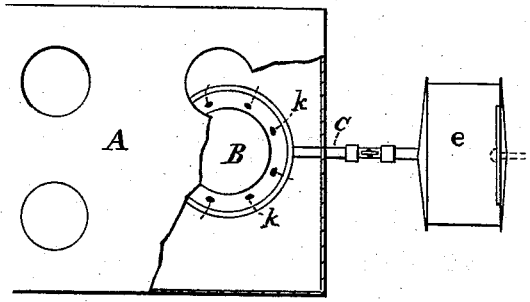

Figure 1 represents an interior view of a part of the stove, showing my improved screen or cover; and Fig. 2, a plan view.

Like letters in both figures of the drawings indicate like parts.

This invention consists of a perforated removable barrel-shaped screen provided with a short tube fixed in the bottom, and adapted for use on the burner of a gas-pipe introduced into a gas-stove, so as to protect the flame from the wind, thus permitting it to be used at picnics and for other outdoor purposes, as will be hereinafter more fully explained.

A is the stove, provided with the usual holes for cooking utensils, and with ventilating-openings above and below.

B is the barrel-shaped screen, which rests, by means of a short tube, $c$, in the bottom of it, upon a thimble, $h$, on the end of the gas-pipe C. The barrel shape or elongated form of the screen permits it to completely inclose the burner $g$, the draft entering through the perforations $i$ below, and causing the flames to escape through the perforations $k$ above to the cooking utensils on the stove, thus protecting the flame from the wind when used for outdoor purposes.

I am aware of certain patents on the subject, more particularly that of James Sheedy, No. 101,928, dated April 12, 1870, showing a perforated heater surrounding the burner and a conical distributer fixed within the heater.

I do not claim the devices shown in such patents; but,

Having described my invention, I claim—

1. The removable barrel-shaped screen having the perforations $i$ and $k$, and provided with short tube $c$, adapted to rest on the burner of a gas-pipe, constructed as shown, for the purposes set forth.

2. The removable screen B, having perforations $i$ below and $k$ above, and provided with short tube $c$, in combination with a gas-pipe introduced into a gas cooking-stove and provided with a thimble, $h$, substantially as specified.

In testimony that I claim the foregoing I have hereunto set my hand this 11th day of April, A. D. 1878.

FLORIAN ZUGG.

Witnesses:
J. M. MORSE,
H. W. WELLS.